US012609756B2

(12) United States Patent
Abukawa et al.

(10) Patent No.: US 12,609,756 B2
(45) Date of Patent: Apr. 21, 2026

(54) WIRELESS RELAY APPARATUS, FIRST TERMINAL APPARATUS, SECOND TERMINAL APPARATUS, COMMUNICATION SYSTEM THAT PERFORMS COMMUNICATION OF SOUND SIGNALS

(71) Applicant: JVCKENWOOD Corporation, Yokohama (JP)

(72) Inventors: Tetsuya Abukawa, Yokohama (JP); Hiroaki Kumashiro, Yokohama (JP); Tomonori Nagahama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 346 days.

(21) Appl. No.: 18/394,454

(22) Filed: Dec. 22, 2023

(65) Prior Publication Data

US 2024/0129021 A1 Apr. 18, 2024

Related U.S. Application Data

(63) Continuation of application No. PCT/JP2022/009740, filed on Mar. 7, 2022.

(30) Foreign Application Priority Data

Jun. 25, 2021 (JP) ................................. 2021-105517

(51) Int. Cl.
H04B 7/155 (2006.01)

(52) U.S. Cl.
CPC .................................... H04B 7/155 (2013.01)

(58) Field of Classification Search
CPC ...... H04B 7/155; H04B 7/088; H04B 7/0695; H04B 7/0617; H04B 17/336;
(Continued)

(56) References Cited

U.S. PATENT DOCUMENTS

2006/0159238 A1* 7/2006 Akita ...................... H04W 4/10
379/88.01
2010/0208630 A1* 8/2010 Nakahara .......... H04M 3/42221
707/802

(Continued)

FOREIGN PATENT DOCUMENTS

JP H10-190847 A 7/1998

OTHER PUBLICATIONS

Extended European Search Report from EP Application 22827947.7 mailed Sep. 23, 2024, 9 pages.
(Continued)

*Primary Examiner* — Nimesh Patel
(74) *Attorney, Agent, or Firm* — Shih IP Law Group, PLLC

(57) ABSTRACT

When a second communication unit receives an identifier received last in time by a second terminal apparatus from the second terminal apparatus as a last identifier, a relay recording control unit causes the second communication unit to transmit a list of identifiers recorded in a recording unit after the last identifier to the second terminal apparatus, and that, when the second communication unit receives the identifier included in the list from the second terminal apparatus as a transmission request identifier, extracts a first sound signal corresponding to the transmission request identifier from the recording unit and causes the recording unit to transmit the first sound signal extracted to the second terminal apparatus as the second sound signal.

5 Claims, 15 Drawing Sheets

(58) Field of Classification Search

CPC ........................... H04B 17/318; H04B 17/345; H04B 7/06964; H04B 17/29; H04B 7/0632; H04B 17/309; H04B 7/0452; H04B 1/7097; H04M 3/566; H04M 3/42059; H04M 3/2236; H04M 3/568; H04M 1/72454; H04W 4/10; H04W 88/04; H04W 4/02; H04W 72/23; H04W 72/1268; H04W 72/0446; H04W 72/21; H04W 74/0808; H04W 60/04; H04W 48/10; H04W 72/02; H04W 72/25; H04W 88/10; H04W 16/28; H04W 72/12; H04W 72/541; H04W 72/543; H04W 72/30; H04W 16/10; H04W 24/04; H04L 1/1803; H04L 1/203; H04L 1/0007; H04L 1/0014; H04L 65/4061; H04L 65/80; H04L 5/001; H04L 1/08; H04L 5/0023; H04L 5/0044; H04L 5/0055; H04L 5/0007; H04L 1/1812; H04L 5/0035; H04L 5/0057; H04L 27/261; H04L 5/0064; H04L 1/1614; H04L 1/1861; H04L 1/1887; H04L 1/189; H04L 5/006; H04L 1/0026; H04L 1/1819; H04L 27/2613; H04L 41/0894; H04L 1/0041; H04L 5/0042; H04L 5/0005; H04L 65/1016; H04L 5/0037; H04L 25/0224; H04L 43/16; H04L 41/5009; Y02D 30/70

See application file for complete search history.

(56) References Cited

U.S. PATENT DOCUMENTS

| | | | | |
|---|---|---|---|---|
| 2017/0273124 A1* | 9/2017 | Yang | ................. | H04M 3/42059 |
| 2019/0208410 A1* | 7/2019 | Yuen | ................... | H04L 61/4547 |
| 2019/0387065 A1* | 12/2019 | Lau | ....................... | G06F 16/162 |

OTHER PUBLICATIONS

International Search Report for the corresponding PCT Application No. PCT/JP2022/009740, 4 pages, May 17, 2022.
International Preliminary Examination Report on Patentability (I) for the corresponding PCT Application No. PCT/JP2022/009740, 10 pages, Dec. 14, 2023.

* cited by examiner

FIG. 3B

| Call ID | Call Quality | | | |
|---|---|---|---|---|
| | BER (%) | RSSI (Strength) | Broken Block Number | All Block Number |
| 001-01 | 1% | -100dBm | 2 | 200 |
| 001-02 | 0.01% | -80dBm | 0 | 500 |
| 001-03 | 0.01% | -80dBm | 0 | 300 |
| 002-01 | 1% | -100dBm | 1 | 100 |
| 002-02 | 4% | -128dBm | 150 | 3750 |
| 002-03 | 1% | -100dBm | 1 | 100 |
| ... | ... | ... | ... | ... |
| 002-02 | 0.001% | -80dBm | 0 | 1000 |
| 002-02 | 0% | -75dBm | 0 | 1300 |

FIG. 3A

| Call ID | Receive Time (yymmdd:hh:mm:ss) | Source ID (Unit ID) | Destination ID (Group ID) |
|---|---|---|---|
| 001-01 | 2021.03.01.12:38:45 | P1 | 001 |
| 001-02 | 2021.03.01.12:39:45 | P3 | 001 |
| 001-03 | 2021.03.01.12:40:50 | P2 | 001 |
| 002-01 | 2021.03.01.12:50:50 | P2 | 001 |
| 002-02 | 2021.03.01.12:51:50 | P4 | 001 |
| 002-03 | 2021.03.01.12:52:30 | P2 | 001 |
| ... | ... | ... | ... |
| 112-01 | 2021.03.01.15:51:50 | P2 | 005 |
| 112-02 | 2021.03.01.15:53:00 | P3 | 005 |

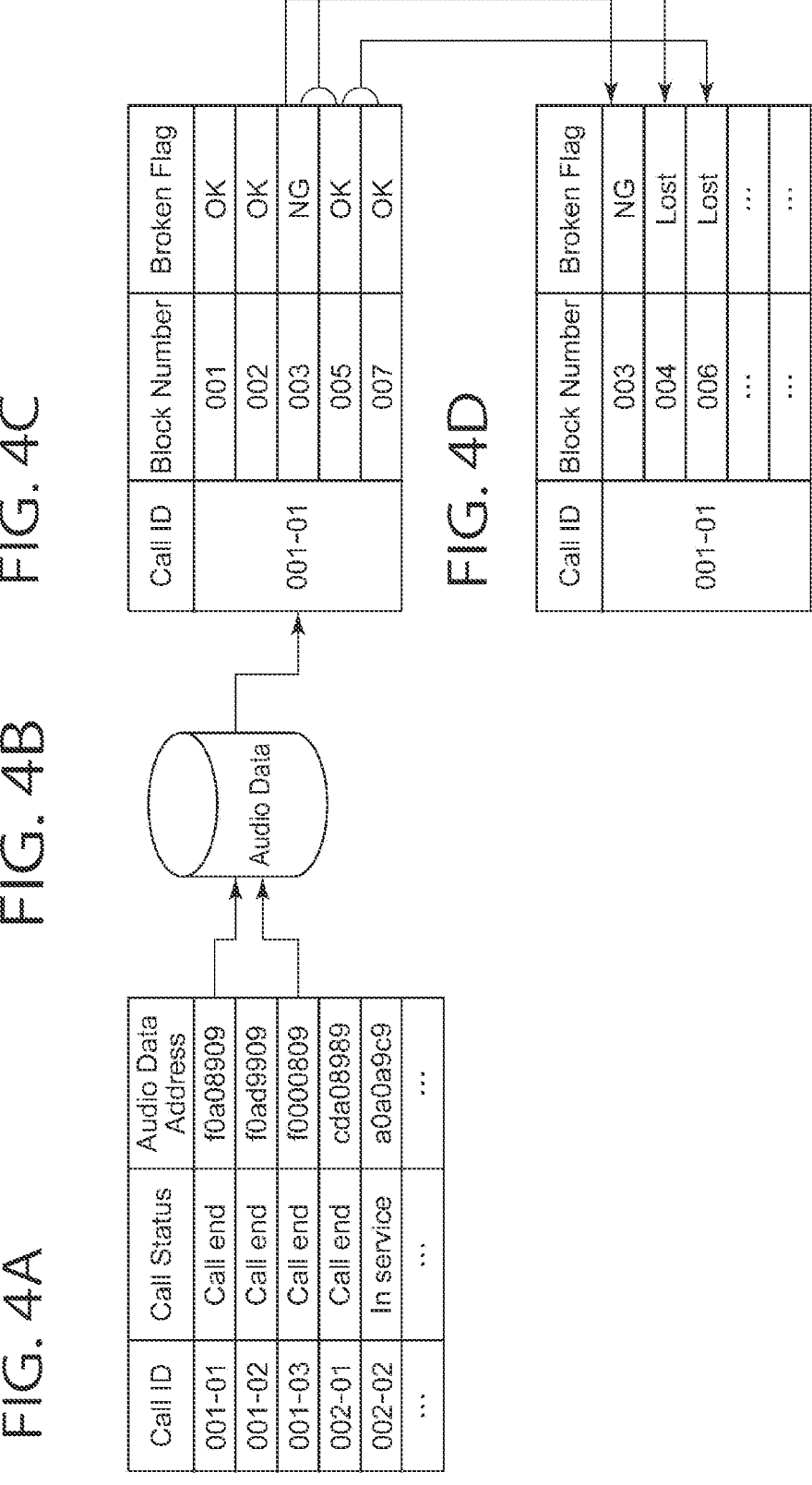

FIG. 6

| Group | Call ID |
|-------|---------|
| 001 | 001-03 |
| 002 | 011-02 |
| 003 | 032-03 |
| 004 | 122-01 |
| 005 | 112-02 |
| ... | ... |

FIRST TERMINAL APPARATUS

100a

100b

WIRELESS RELAY APPARATUS, FIRST TERMINAL APPARATUS, SECOND TERMINAL APPARATUS, COMMUNICATION SYSTEM THAT PERFORMS COMMUNICATION OF SOUND SIGNALS

TECHNICAL FIELD

The present invention relates to communication technology and, more particularly, to a wireless relay apparatus, a first terminal apparatus, a second terminal apparatus, and a communication system that performs communication of sound signals.

BACKGROUND ART

In a communication system such as that of mobile communication, an answering machine system for terminal apparatuses is provided. The control station on the network side checks for connection of a terminal apparatus and notifies the terminal apparatus that there is a message when the terminal apparatus is connected (for example, PATENT LITERATURE 1).

[PATENT LITERATURE 1] JP H10-190847

SUMMARY OF INVENTION

Technical Problem

Since patent literature 1 assumes individual calls, the control station can confirm whether the terminal apparatus is connected and can know from what point of time the terminal apparatus has not received a call. In a group call by simplex communication, however, it is difficult to confirm whether the terminal apparatus is connected.

The present invention addresses the issue described above, and a purpose thereof is to provide a technology for reliably performing communication of information signals exemplified by sound.

Solution to Problem

A wireless relay apparatus according to an embodiment of the present invention includes: a first communication unit that receives a first sound signal with an identifier attached thereto from a first terminal apparatus; a recording unit that records the first sound signal and the identifier received by the first communication unit; and a relay recording control unit that, when the second communication unit receives the identifier received last in time by the second terminal apparatus from the second terminal apparatus as a last identifier, causes the second communication unit to transmit a list of identifiers recorded in the recording unit after the last identifier to the second terminal apparatus, and that, when the second communication unit receives the identifier included in the list from the second terminal apparatus as a transmission request identifier, extracts the first sound signal corresponding to the transmission request identifier from the recording unit and causes the second communication unit to transmit the first sound signal extracted to the second terminal apparatus as the second sound signal.

Another embodiment of the present invention relates to a communication system. The communication system includes: a first terminal apparatus that transmits a first sound signal with an identifier attached thereto; a wireless relay apparatus that transmits the first sound signal as a second sound signal along with the identifier, when the first sound signal with the identifier attached thereto is received from the first terminal apparatus; and a second terminal apparatus that receives the second sound signal with the identifier attached thereto from the wireless relay apparatus. The wireless relay apparatus includes: a recording unit that records the first sound signal and the identifier received; a sound quality evaluation unit that evaluates a quality of the first sound signal received, that transmits the identifier to the first terminal apparatus as a retransmission request identifier, when an evaluation value is lower than a threshold value, and that replaces the first sound signal recorded in the recording unit with the first sound signal re-received, when the first sound signal with the retransmission request identifier attached thereto is re-received from the first terminal apparatus and when the evaluation value is equal to or higher than the threshold value: and a relay recording control unit that, when the identifier received last in time by the second terminal apparatus is received from the second terminal apparatus as a last identifier, transmits a list of identifiers recorded in the recording unit after the last identifier to the second terminal apparatus, and that, when the identifier included in the list is received from the second terminal apparatus as a transmission request identifier, extracts the first sound signal corresponding to the transmission request identifier from the recording unit and transmit the first sound signal extracted to the second terminal apparatus as the second sound signal.

Optional combinations of the aforementioned constituting elements, and implementations of the embodiment in the form of methods, apparatuses, systems, recording mediums, and computer programs may also be practiced as additional modes of the present invention.

BRIEF DESCRIPTION OF DRAWINGS

FIG. 3A to 3B show a data structure of a database stored in the wireless relay apparatus of FIG. 1.

FIGS. 4A to 4D show an overview of the process in the wireless relay apparatus of FIG. 1.

FIG. 6 shows a data structure of another database stored in the wireless relay apparatus of FIG. 1.

DESCRIPTION OF EMBODIMENTS

Figure 1:
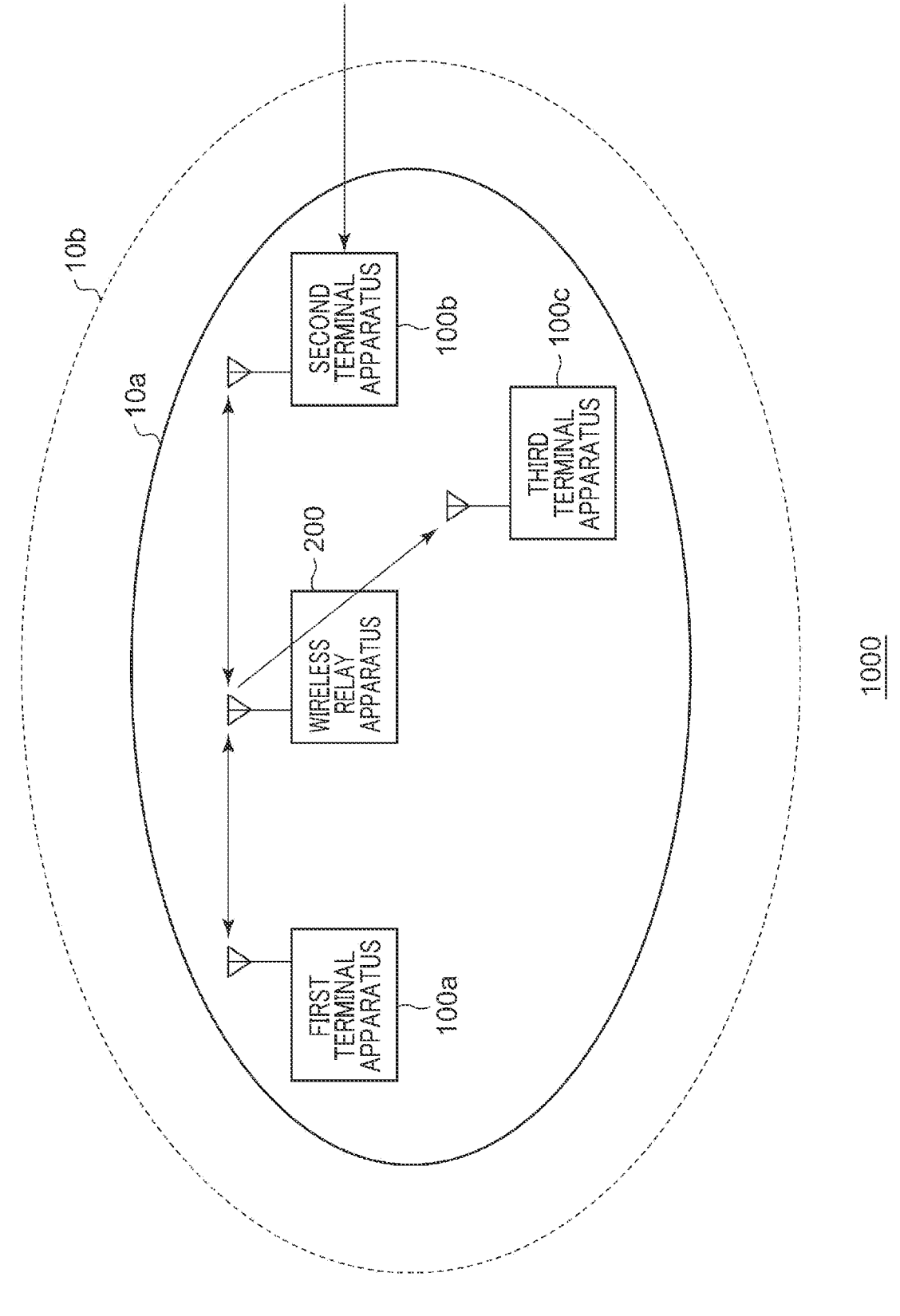
FIG. 1 shows a configuration of a communication system according to an embodiment.

Before describing the present invention in specific details, we will first describe an overview. When it is detected that a call cannot be made in a related-art system capable of bidirectional communication such as the telephone, the system can record a sound and automatically transmit the recorded sound when a call becomes enabled. On the other hand, the embodiment of the present invention relates to a simplex (unidirectional) communication system. For example, a terminal apparatus on the transmitting side transmits a sound signal (hereinafter referred to as a "first sound signal") to a wireless relay apparatus, and the wireless relay apparatus transmits the received first sound signal to the terminal apparatus on the receiving side as a second audio signal. When a group call is made, a plurality of terminal apparatuses on the receiving side are included.

In simplex communication, signals cannot be received while a signal is being transmitted so that the terminal apparatus on the transmitting cannot recognize the signal reception status in the wireless relay apparatus or the terminal apparatus on the receiving side. In particular, even if there is a terminal apparatus on the receiving side that cannot receive radio waves from the wireless relay apparatus in a group call by simplex communication, the wireless relay apparatus cannot recognize from what point of time the terminal apparatus on the receiving side has not received a call. Furthermore, the point of time when reception is not made differs between the plurality of terminal apparatuses on the receiving side. That is, a technology for efficiently retransmitting calls to terminal apparatuses on the receiving side in various conditions is required. In addition, the terminal apparatus on the transmitting side does not detect whether the wireless relay apparatus was able to receive a signal normally from the terminal apparatus on the transmitting side. Therefore, the wireless relay apparatus is also required to be equipped with a technology that can reliably receive a signal from the terminal apparatus on the transmitting side and relay it to the terminal apparatus on the receiving side.

The terminal apparatus on the transmitting side in this embodiment records the transmitted first sound signal, and the wireless relay apparatus records the received first sound signal. Furthermore, the first sound signal and the second sound signal are managed by identifiers (hereinafter referred to as a "call ID"). When the quality of the received first sound signal is low, the wireless relay apparatus reliably records the first sound signal reliably by requesting retransmission from the terminal apparatus on the transmitting side. When the terminal apparatus on the receiving end moves from outside a communication service area into a communication service area and connects to the wireless relay apparatus, the terminal apparatus transmits the call ID of the second sound signal received last in time when it was previously located in the communication service area (hereinafter referred to as a "last call ID") to the wireless relay apparatus. The wireless relay apparatus acquires the last call ID from the terminal apparatus on the receiving side and transmits the unreceived first sound signal to the terminal apparatus on the receiving side as the second sound signal, using the first sound signal as recorded. Thereby, reliable transmission from the first terminal apparatus to the wireless relay apparatus and reliable transmission from the wireless relay apparatus to the second terminal apparatus are realized.

FIG. 1 shows a configuration of a communication system 1000. The communication system 1000 includes a first terminal apparatus 100*a* to a third terminal apparatus 100*c*, which are generically referred to as a terminal apparatus 100, and a wireless relay apparatus 200. The number of terminal apparatuses 100 included in the communication system 1000 is not limited to "3", and the number of wireless relay apparatuses 200 is not limited to "1". In the communication system 1000, simplex communication is performed.

The terminal apparatus 100 is, for example, a wireless apparatus capable of performing sound communication by PTT (Push to Talk). In PTT, the terminal apparatus 100 can transmit a sound signal while the PTT button of the terminal apparatus 100 is being pressed down. When the PTT button of the terminal apparatus 100 is not pressed down, on the other hand, the terminal apparatus 100 can receive a sound signal. By way of one example, the first terminal apparatus 100*a* corresponds to the terminal apparatus on the transmitting side described above, and the second terminal apparatus 100*b* and the third terminal apparatus 100*c* correspond to the terminal apparatus on the receiving side described above.

The wireless relay apparatus 200 is a wireless device that relays communication between a plurality of terminal apparatuses 100. The transmission output of the wireless relay apparatus 200 is often set to be larger than the transmission output of the terminal apparatus 100. A first communication service area 10*a* is formed around the wireless relay apparatus 200, and a second communication service area 10*b* is formed around the first communication service area 10*a*. The first communication service area 10*a* is an area in which communication from the wireless relay apparatus 200 to the terminal apparatus 100 and communication from the terminal apparatus 100 to the wireless relay apparatus 200 are possible. The second communication service area 10*b* is an area in which communication from the wireless relay apparatus 200 to the terminal apparatus 100 is possible but communication from the terminal apparatus 100 to the wireless relay apparatus 200 is impossible. However, the boundary between the first communication service area 10*a* and the second communication service area 10*b* is not clear. The quality of communication from the terminal apparatus 100 to the wireless relay apparatus 200 gradually deteriorates as the terminal moves in a direction away from the first communication service area 10*a*.

The first terminal apparatus 100*a* transmits the first sound signal with a call ID attached thereto when the PTT button is pressed down. When the wireless relay apparatus 200 receives the first sound signal with the call ID attached thereto from the first terminal apparatus 100*a*, the wireless relay apparatus 200 transmits the first sound signal as the second sound signal along with the call ID. When the second terminal apparatus 100*b* and the third terminal apparatus 100*c* are located in the first communication service area 10*a* or the second communication service area 10*b*, the second terminal apparatus 100*b* and the third terminal apparatus 100*c* receive the second sound signal with the call ID attached thereto from the wireless relay apparatus 200. In this way, a group call by the first terminal apparatus 100*a*, the second terminal apparatus 100*b*, and the third terminal apparatus 100*c* is performed.

In such a situation, it is preferable to eliminate miscalls in a group call, but it is desirable to transmit a sound signal even if a miscall occurs. Further, when simplex communication is performed, the user of the first terminal apparatus 100a cannot know whether a miscall has occurred in the second terminal apparatus 100b or in the third terminal apparatus 100c. Hereinafter, a process for solving this issue will be described, and the process is divided into the first process between the first terminal apparatus 100a and the wireless relay apparatus 200 and the second process between the wireless relay apparatus 200 and the second terminal apparatus 100b.

Since the second terminal apparatus 100b is moving from outside the second communication service area 10b toward the first communication service area 10a as shown in FIG. 1, it is presumed that a miscall may occur in the second terminal apparatus 100b. On the other hand, the third terminal apparatus 100c stays in the first communication service area 10a as shown in FIG. 1 so that it is presumed that a miscall does not occur in the third terminal apparatus 100c. Therefore, only the second terminal apparatus 100b will be described hereinafter as the terminal apparatus on the receiving side.

Figure 2:
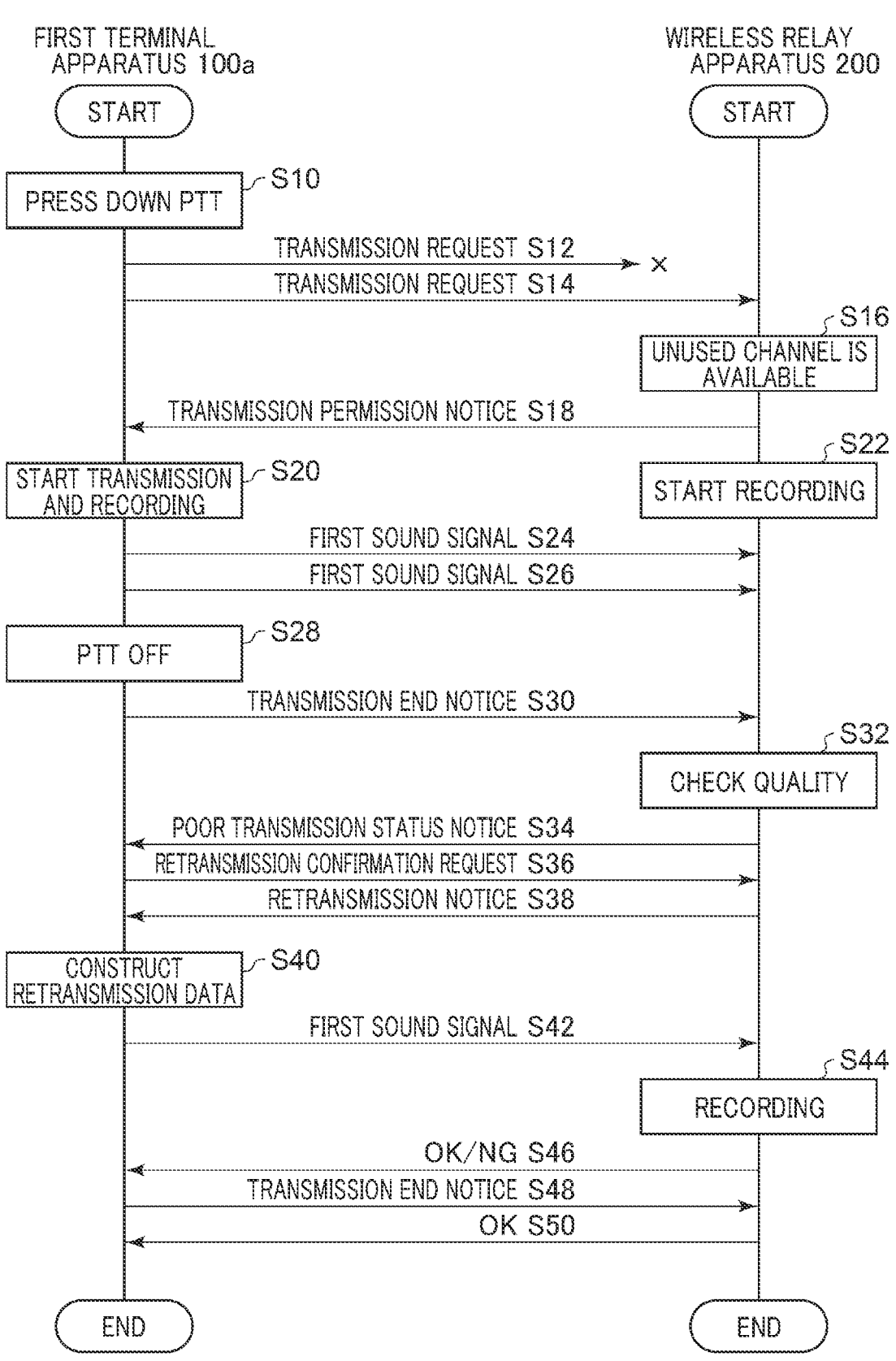
FIG. 2 is a sequence chart showing a communication procedure performed by the first terminal apparatus and the wireless relay apparatus of FIG. 1.

FIG. 2 is also used to describe the first process. FIG. 2 is a sequence chart showing a communication procedure performed by the first terminal apparatus 100a and the wireless relay apparatus 200. The PTT button is pressed down in the first terminal apparatus 100a (S10). The first terminal apparatus 100a transmits a transmission request to the wireless relay apparatus 200 to request channel assignment (S12). S12 represents a case where radio waves have not reached the wireless relay apparatus 200. If there is no response from the wireless relay apparatus 200 within a preset time, for example, the first terminal apparatus 100a transmits a transmission request again to the wireless relay apparatus 200 to request channel assignment (S14). When the wireless relay apparatus 200 receives a transmission request, it checks that an unused channel is available (S16). The wireless relay apparatus 200 allocates the first terminal apparatus 100a to the unused channel and transmits a transmission permission notice to the first terminal apparatus 100a (S18). The first terminal apparatus 100a starts transmitting and recording the sound and data (S20), and the wireless relay apparatus 200 starts receiving and recording the sound and data (S22).

The first terminal apparatus 100a transmits the first sound signal to the wireless relay apparatus 200 (S24, S26). The first terminal apparatus 100a records the first sound signal to be transmitted, and the wireless relay apparatus 200 records the received first sound signal. FIG. 3A to 3B show a data structure of a database stored in the wireless relay apparatus 200. FIG. 3A shows information on the first sound signal stored in the wireless relay apparatus 200. "Call ID" indicates the call ID, "Receive Time" indicates the time of reception by the wireless relay apparatus 200, "Source ID" indicates the ID of the transmission source terminal apparatus 100, and "Destination ID" indicates the ID of the destination terminal apparatus 100. In the case of a group call, "Destination ID" is the ID of the destination group. FIG. 3B shows information on the quality of the first sound signal measured by the wireless relay apparatus 200. Quality measures include BER (Bit Error Rate), RSSI (Received Signal Strength Indicator), and Broken Block Number. Since known techniques may be used for these measurements, a description thereof is omitted here.

FIGS. 4A to 4D show an overview of the process in the wireless relay apparatus 200. FIG. 4A shows information on the address of the first sound signal stored in the wireless relay apparatus 200. The address indicates a location where the first sound signal is stored in "Audio Data" of FIG. 4B. "Audio Data" is an area in which the first sound signal is stored in a recording unit 260. FIGS. 4C to 4D will be described later, and reference is made back to FIG. 3. The PTT button is turned off in the first terminal apparatus 100a (S28). The first terminal apparatus 100a transmits a transmission end notice to the wireless relay apparatus 200 (S30). When the wireless relay apparatus 200 receives the transmission end notice, the wireless relay apparatus 200 checks the quality of the recorded first sound signal (S32). FIG. 4C shows a result of checking the quality of the first sound signal. The sound signal in a call indicated by "Call ID" is divided into a plurality of blocks and recorded accordingly. The blocks are managed by sequential block numbers indicated by "Block Number". The quality of the sound signal is checked block by block. When there is no problem with the quality of the first sound signal, "OK" is set in "Broken Flag", and when the quality of the first sound signal is deteriorated, "NG" is set in "Broken Flag". Also, when the first sound signal cannot be acquired, "Lost" is set in "Broken Flag". The case where the quality of the first sound signal is deteriorated and the case where the first sound signal cannot be acquired represent cases where there is a problem with the quality of the first sound signal. FIG. 4D shows a result of extracting, from FIG. 4C, information on the block ID associated with a problem with the quality of the first sound signal. For example, the block number 004 is not found in FIG. 4C, and so it is detected that the sound signal of the block of the first sound signal having the block number 004 could not be acquired. Reference is made back to FIG. 2.

When there is a first sound signal having a quality problem, the wireless relay apparatus 200 transmits a poor call status notice to the first terminal apparatus 100a (S34). When the first terminal apparatus 100a receives the poor call status notice, the first terminal apparatus 100a transmits a retransmission confirmation request to the wireless relay apparatus 200 (S36). When the wireless relay apparatus 200 receives the retransmission confirmation request, the wireless relay apparatus 200 transmits a retransmission notice indicating the block of the first sound signal having a quality problem to the first terminal apparatus 100a (S38). The first terminal apparatus 100a constructs retransmission data so as to include the block indicated by the received retransmission notice (S40) and transmits the constructed retransmission data to the wireless relay apparatus 200 as the first sound signal (S42).

The wireless relay apparatus 200 records the first sound signal (S44). The wireless relay apparatus 200 transmits "OK" or "NG" information to the first terminal apparatus 100a to indicate a result of the first sound signal (S46). The first terminal apparatus 100a transmits a transmission end notice to the wireless relay apparatus 200 (S48), and the wireless relay apparatus 200 transmits "OK" information responsive to the transmission end notice to the first terminal apparatus 100a.

Figure 5:
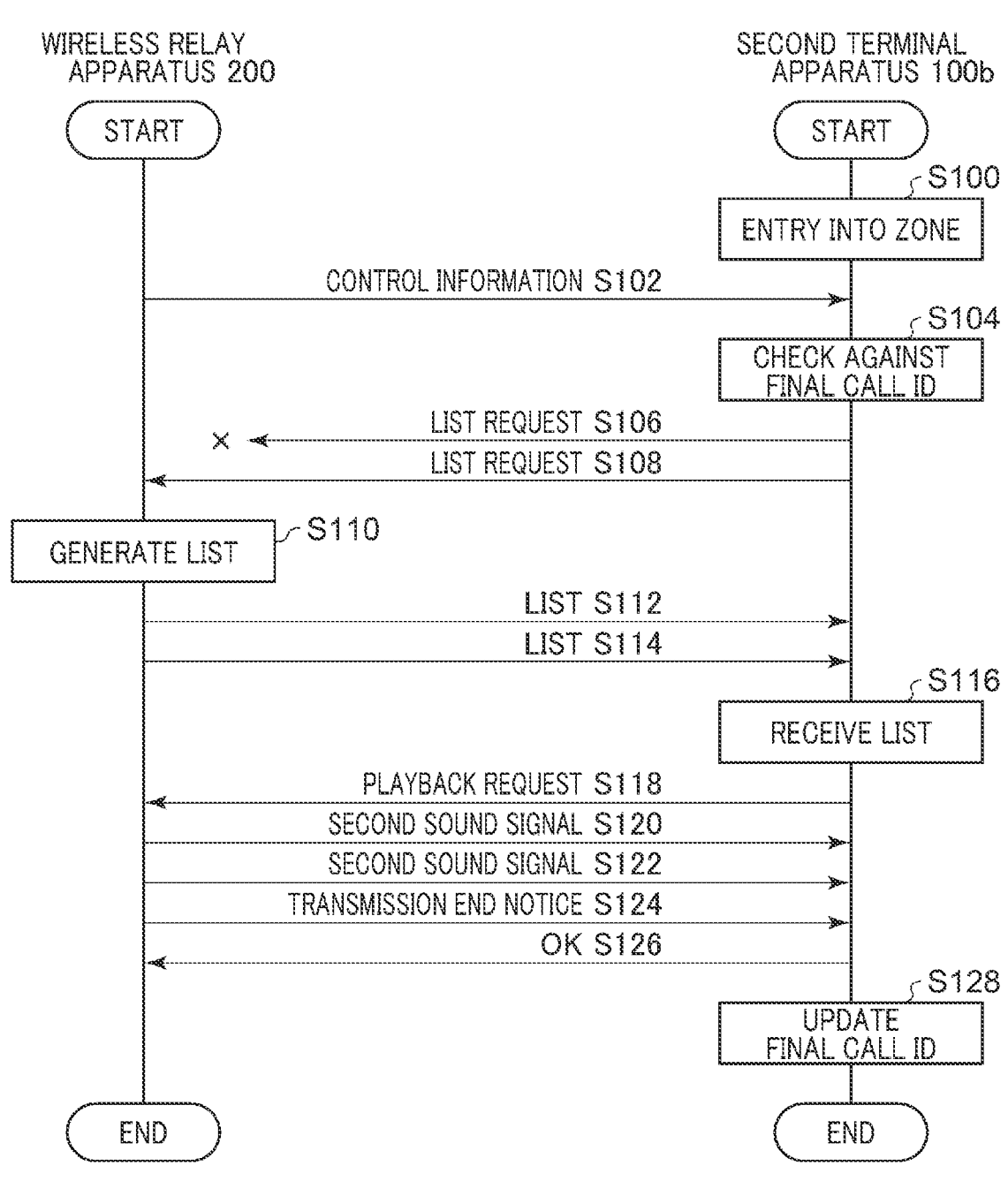
FIG. 5 is a sequence chart showing a communication procedure performed by the wireless relay apparatus and the second terminal apparatus of FIG. 1.

FIG. 5 is also used to describe the second process. FIG. 5 is a sequence chart showing a communication procedure performed by the wireless relay apparatus 200 and the second terminal apparatus 100b. As described above, the second terminal apparatus 100b moves from outside the second communication service area 10b toward the first communication service area 10a as shown in FIG. 1 and enters the zone of the second communication service area 10b (S100). The wireless relay apparatus 200 periodically transmits control information including the call ID of the second sound signal transmitted last in time (S102). FIG. 6 shows a data structure of another database stored in the wireless relay apparatus 200. The call ID of the second sound signal last transmitted in time from the wireless relay apparatus 200 is stored for each group. Hereinafter, one group is the subject of description. Reference is made back to FIG. 5.

The second terminal apparatus 100*b* checks the call ID included in the control information with the last call ID (S104). When the call ID and the last call ID do not match, the second terminal apparatus 100*b* transmits a list request to the wireless relay apparatus 200 (S106). Since the second terminal apparatus 100*b* is located in the second communication service area 10*b*, the list request is not received by the wireless relay apparatus 200. When the second terminal apparatus 100*b* enters the first communication service area 10*a*, the list request from the second terminal apparatus 100*b* is received by the wireless relay apparatus 200 (S108). The wireless relay apparatus 200 generates a list (S110). The wireless relay apparatus 200 transmits the list to the second terminal apparatus 100*b* (S112, S114).

The second terminal apparatus 100*b* receives the list (S116). The second terminal apparatus 100*b* transmits a playback request indicating the call ID, from among the call IDs included in the list, for which playback is requested to the wireless relay apparatus 200 (S118). The wireless relay apparatus 200 transmits the second sound signal of the call ID indicated in the playback request to the second terminal apparatus 100*b* (S120, S122). After transmitting the second sound signal, the wireless relay apparatus 200 transmits a transmission end notice to the second terminal apparatus 100*b* (S124). The second terminal apparatus 100*b* transmits "OK" information responsive to the transmission end notice to the wireless relay apparatus 200 (S126). The second terminal apparatus 100*b* updates the last call ID (S128).

Hereinafter, the configuration of the first terminal apparatus 100*a*, the wireless relay apparatus 200, and the second terminal apparatus 100*b* in the communication system 1000 will be described in the order of (1) first process and (2) second process.

(1) First Process

Figure 7:
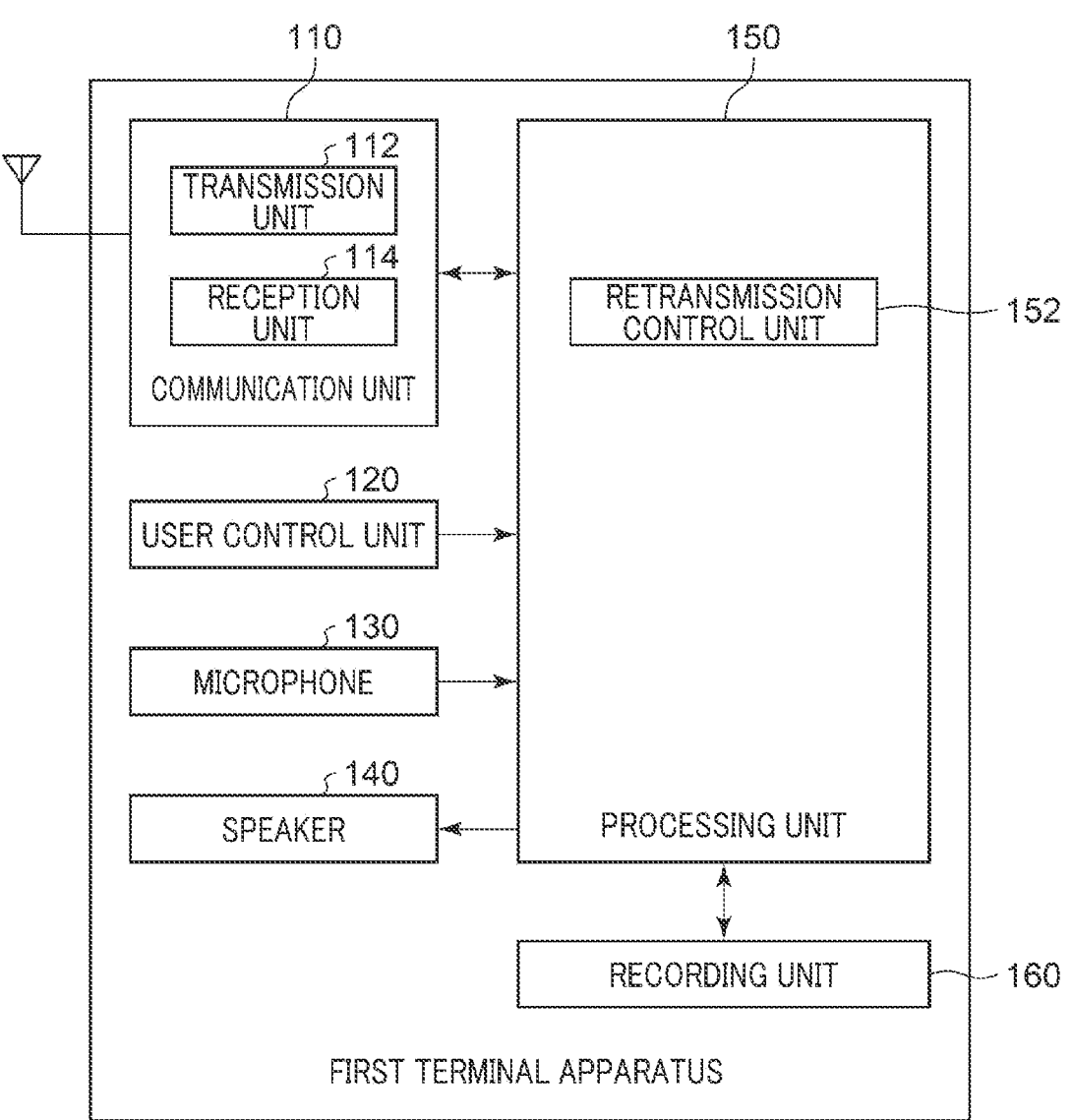
FIG. 7 shows a configuration of the first terminal apparatus of FIG. 1.

FIG. 7 shows a configuration of the first terminal apparatus 100*a*. The first terminal apparatus 100*a* includes a communication unit 110, a user control unit 120, a microphone 130, a speaker 140, a processing unit 150, and a recording unit 160. The communication unit 110 includes a transmission unit 112 and a reception unit 114, and the processing unit 150 includes a retransmission control unit 152. The communication unit 110 performs simplex wireless communication. Therefore, the reception unit 114 does not receive a signal during a period when the transmission unit 112 is transmitting a signal, and the transmission unit 112 does not transmit a signal during a period when the reception unit 114 is receiving the signal. That is, one of the transmission unit 112 and the reception unit 114 operates and the other stops.

The user control unit 120 is configured by a button, a touch panel, or the like, and receives an input from the user. It should be noted here that the button corresponds to a PTT button, and the user control unit 120 receives an instruction for PTT transmission in response to the PTT button being pressed down. On the other hand, the user control unit 120 receives an end of transmission by PTT in response to the PTT button being released. The user control unit 120 outputs the received input to the processing unit 150.

The microphone 130 acquires the sound from the user while the PTT button is being pressed down. The microphone 130 converts the sound into an electrical signal and outputs the sound in the form of the electrical signal (hereinafter also referred to as "sound") to the processing unit 150. The speaker 140 outputs the sound played back by the processing unit 150.

Figure 8:
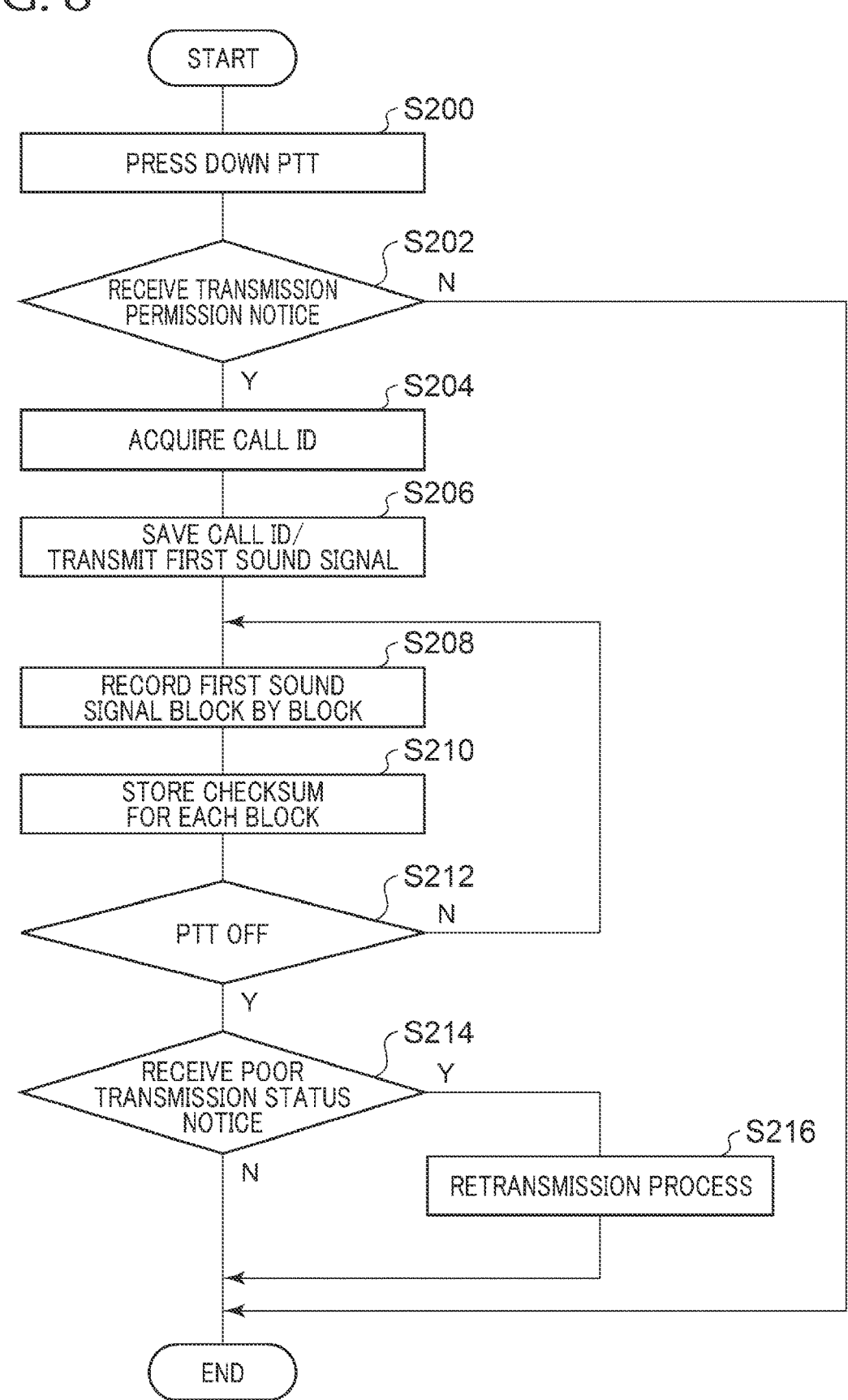
FIG. 8 is a flowchart showing a communication procedure performed by the first terminal apparatus of FIG. 7.
Figure 9:
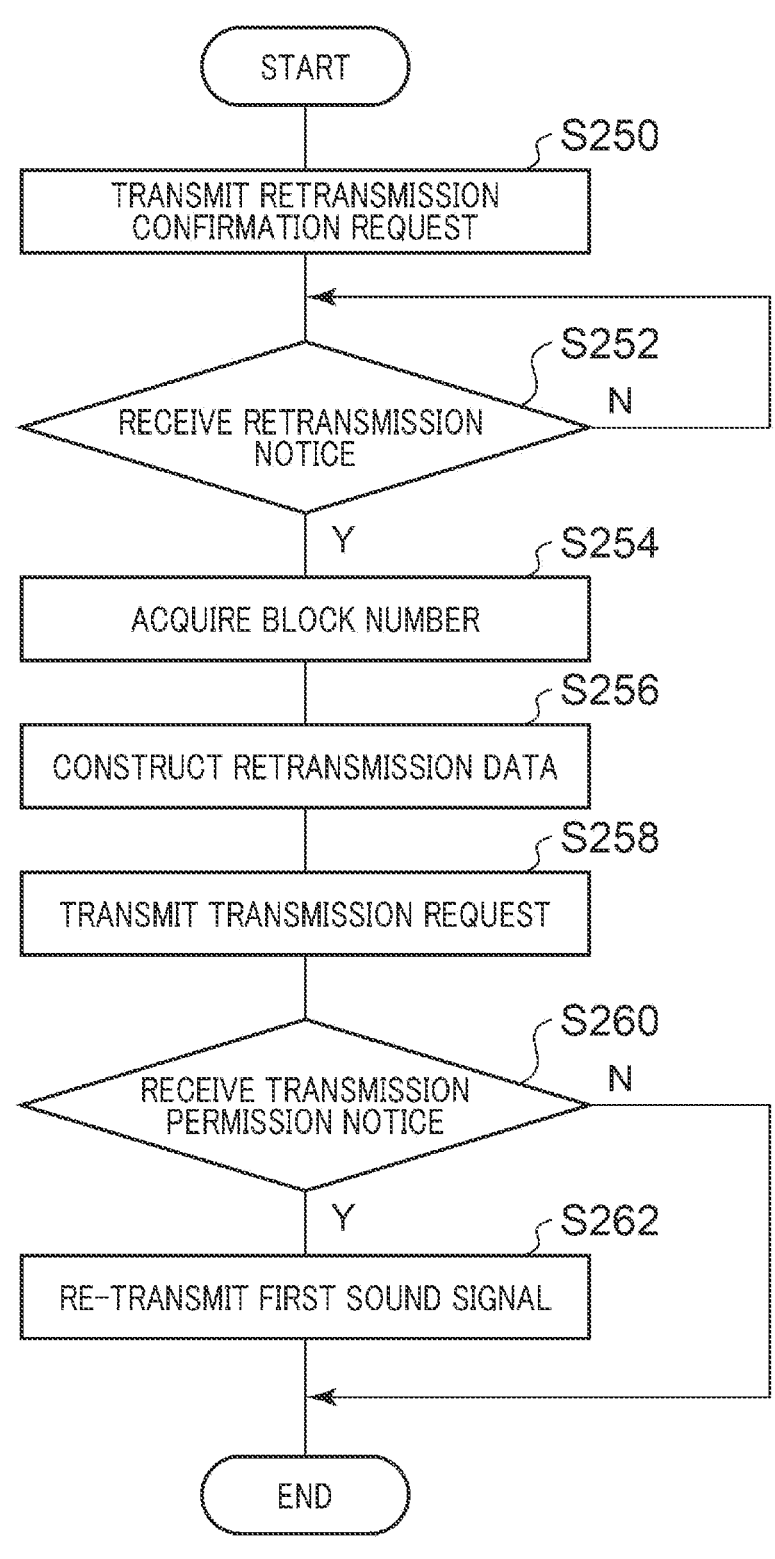
FIG. 9 is a flowchart showing a procedure for retransmission process performed by the first terminal apparatus of FIG. 7.

The processing unit 150 controls the operation of the first terminal apparatus 100*a* using the recording unit 160. FIGS. 8 and 9 are also used to describe the process in the processing unit 150. FIG. 8 is a flowchart showing a communication procedure performed by the first terminal apparatus 100*a*. When the PTT button is pressed down (S200), the processing unit 150 causes the transmission unit 112 to transmit a transmission request. The transmission unit 112 transmits a transmission request to the wireless relay apparatus 200 according to an instruction from the processing unit 150. When the reception unit 114 receives a transmission permission notice from the wireless relay apparatus 200 as a result of the first terminal apparatus 100*a* being allocated to an unused channel in the wireless relay apparatus 200 (Y in S202), the processing unit 150 acquires the call ID included in the transmission permission notice (S204).

The processing unit 150 stores the call ID in the recording unit 160, generates the first sound signal based on the sound from the microphone 130, and causes the first sound signal to be transmitted from the transmission unit 112 (S206). The transmission unit 112 transmits the first sound signal with the call ID attached thereto to the wireless relay apparatus 200. Further, the processing unit 150 causes the recording unit 160 to record the first sound signal block by block (S208) and stores a checksum for each block in the recording unit 160 (S210). The recording unit 160 records the first sound signal and the call ID transmitted from the transmission unit 112 and records the checksum and the attribute data. When the PTT is not turned off (N in S212), control returns to step 208. When the transmission is terminated as a result of PTT being turned off (Y in S212), on the other hand, the transmission unit 112 transmits a transmission end notice to the wireless relay apparatus 200.

Since simplex communication is performed in the first terminal apparatus 100*a*, the first terminal apparatus 100*a* cannot recognize in real time whether the first sound signal is normally received by the wireless relay apparatus 200. When there is a problem with the quality of the first sound signal in the wireless relay apparatus 200, the wireless relay apparatus 200 transmits a poor call status notice to the first terminal apparatus 100*a*. When the reception unit 114 receives the poor call status notice (Y in S214), the processing unit 150 performs a retransmission process (S216). When the reception unit 114 does not receive a poor call status notice (N in S214), the process is terminated. When the reception unit 114 does not receive a transmission permission notice from the wireless relay apparatus 200 (N in S202), on the other hand, steps 204 to 216 are skipped.

FIG. 9 is a flowchart showing a procedure for retransmission process performed by the first terminal apparatus 100*a*. This corresponds to step 216 in FIG. 8. When the reception unit 114 receives a poor call status notice, the retransmission control unit 152 transmits a retransmission confirmation request from the transmission unit 112 to the wireless relay apparatus 200 (S250). When the wireless relay apparatus 200 receives the retransmission confirmation request, the wireless relay apparatus 200 transmits a retransmission notice indicating the call ID (retransmission request identifier) and the block number of the first sound signal having a quality problem to the first terminal apparatus 100*a*.

When the reception unit 114 does not receive a retransmission notice from the wireless relay apparatus 200 (N in S252), the reception unit 114 stands by. When the reception unit 114 receives a retransmission notice from the wireless relay apparatus 200 (Y in S252), the retransmission control unit 152 acquires the call ID and the block number from the retransmission notice (S254). The retransmission control unit 152 extracts the first sound signal corresponding to the acquired call ID and block number from the recording unit 160 and constructs retransmission data using the extracted first sound signal (S256).

The retransmission control unit 152 causes the transmission unit 112 to transmit a transmission request. The transmission unit 112 transmits a transmission request to the wireless relay apparatus 200 according to an instruction from the retransmission control unit 152 (S258). When the reception unit 114 receives the transmission permission notice from the wireless relay apparatus 200 (Y in S260), the retransmission control unit 152 causes the transmission unit 112 to retransmit the first sound signal that embodies the retransmission data (S262). The transmission unit 112 retransmits the first sound signal to the wireless relay apparatus 200 according to an instruction from the retransmission control unit 152. When the reception unit 114 does not receive a transmission permission notice from the wireless relay apparatus 200 (N in S260), the process is terminated.

Figure 10:
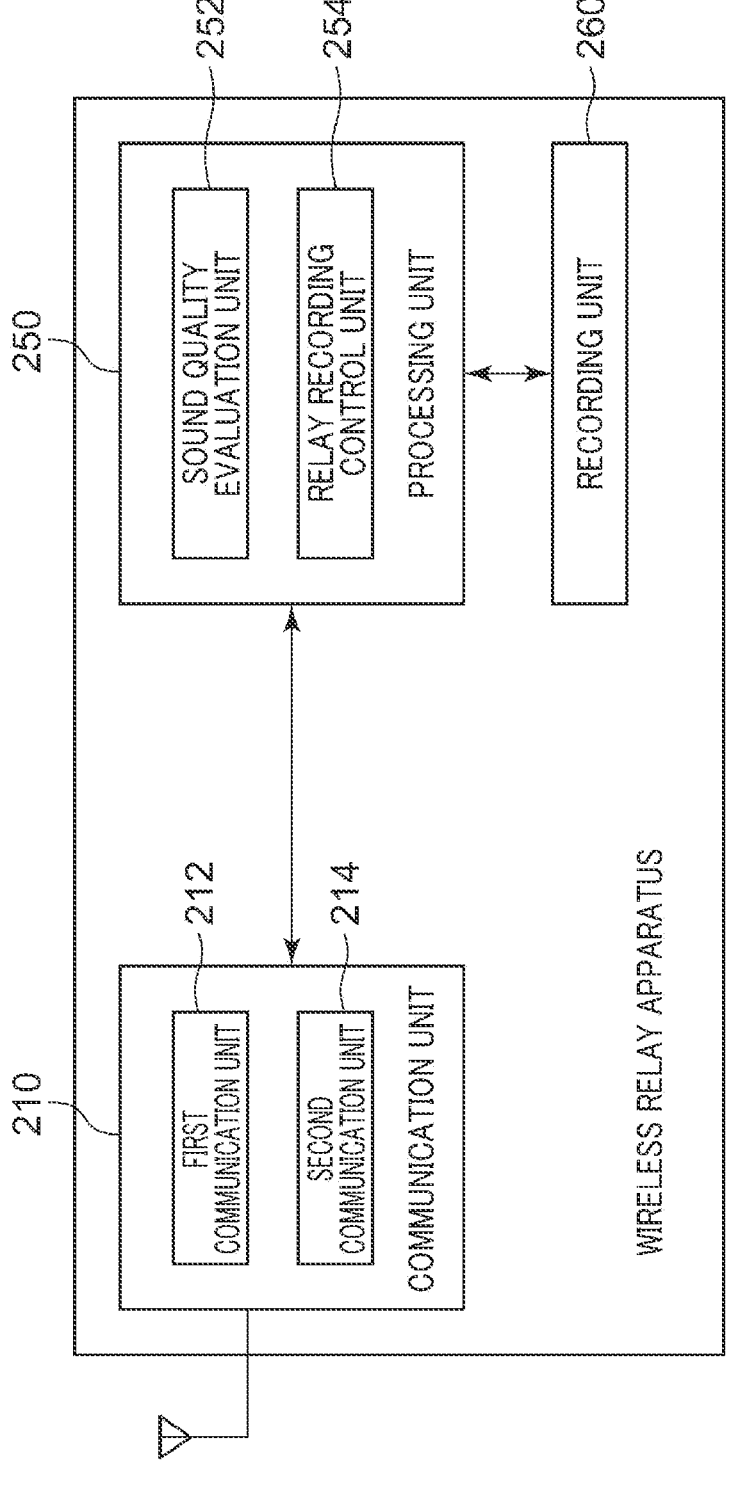
FIG. 10 shows a configuration of the wireless relay apparatus of FIG. 1.

FIG. 10 shows a configuration of the wireless relay apparatus 200. The wireless relay apparatus 200 includes a communication unit 210, a processing unit 250, and a recording unit 260. The communication unit 210 includes a first communication unit 212 and a second communication unit 214, and the processing unit 250 includes a sound quality evaluation unit 252 and a relay recording control unit 254. The communication unit 210 performs simplex wireless communication. That part of the communication unit 210 communicating with the terminal apparatus on the transmission side (e.g., the first terminal apparatus 100a) is the first communication unit 212, and the part communicating with the terminal apparatus on the receiving side (e.g., the second terminal apparatus 100b) is the second communication unit 214. The first communication unit 212 and the second communication unit 214 are configured as separate units for convenience, but they may be integrated.

Figure 11:
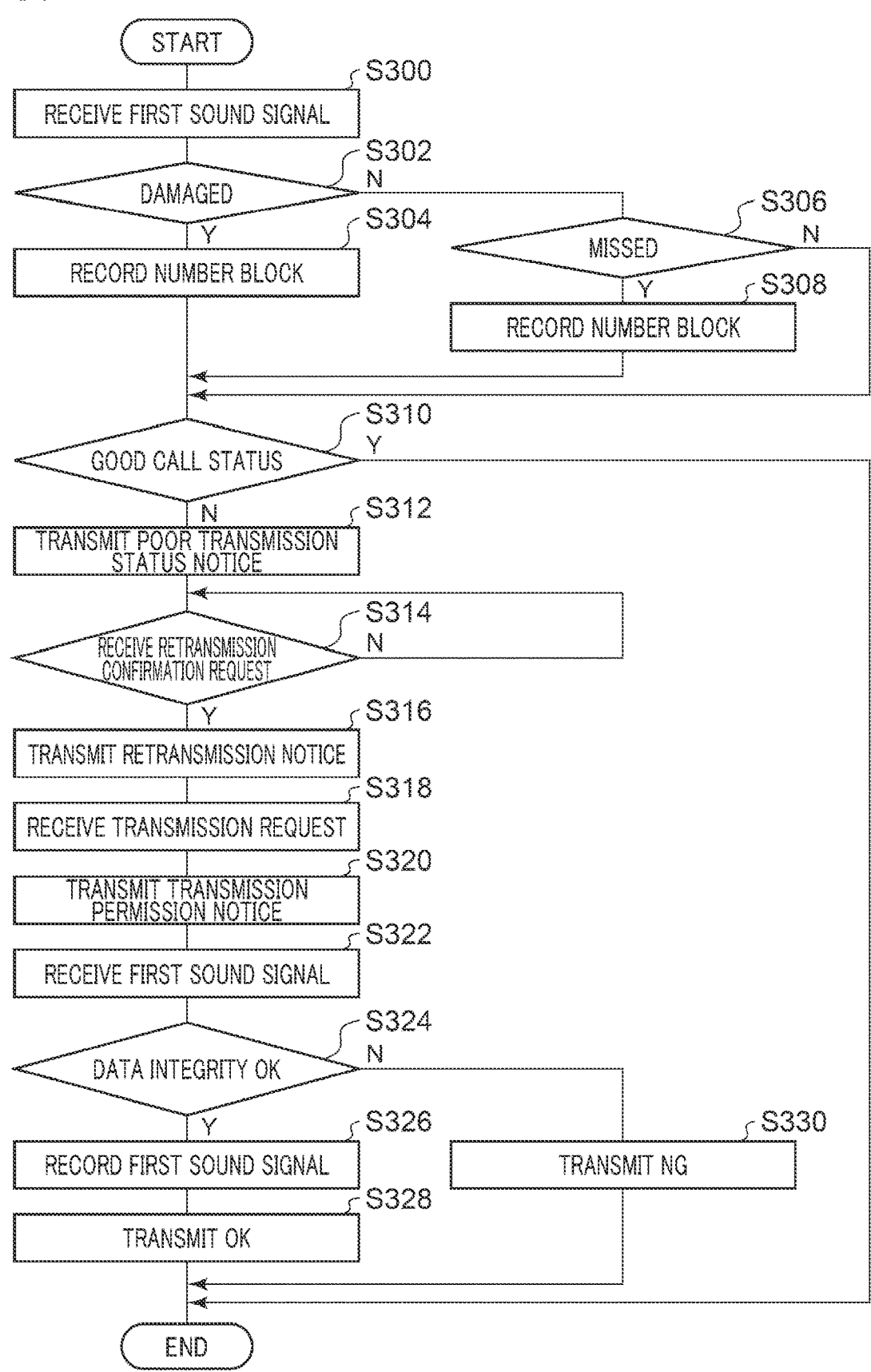
FIG. 11 is a flowchart showing a communication procedure performed by the wireless relay apparatus of FIG. 10.

The processing unit 250 controls the operation of the wireless relay apparatus 200 using the recording unit 260. FIG. 11 is also used to describe the process of the wireless relay apparatus 200. FIG. 11 is a flowchart showing a communication procedure performed by the wireless relay apparatus 200. The first communication unit 212 receives a transmission request from the first terminal apparatus 100a. When the processing unit 250 receives the transmission request, it checks for an unused channel. When it is confirmed that an unused channel is available, the processing unit 250 allocates the first terminal apparatus 100a to the unused channel and causes the first communication unit 212 to transmit a transmission permission notice including the call ID. The first communication unit 212 transmits the transmission permission notice to the first terminal apparatus 100a.

The first communication unit 212 receives the first sound signal with a call ID attached thereto from the first terminal apparatus 100a (S300). The second communication unit 214 transmits the first sound signal received by the first communication unit 212 the second terminal apparatus 100b as the second sound signal along with the call ID. The recording unit 260 is caused to record the first sound signal and the call ID received by the first communication unit 212. The recording unit 260 records the first sound signal and the call ID.

The processing unit 250 measures the quality of the first sound signal received by the first communication unit 212. As described above, the quality of the first sound signal is, for example, BER, RSSI, and Broken Block Number, and known technologies are used for these measurements. As a result of such a process, the recording unit 260 records the tables shown in FIGS. 3A to 3B and FIG. 4A.

The first communication unit 212 receives a transmission end signal from the first terminal apparatus 100a. When the sound quality evaluation unit 252 receives the transmission end notice, the sound quality evaluation unit 252 checks the quality of the first sound signal recorded in the recording unit 260. When the first sound signal is damaged (Y in S302), the processing unit 250 causes the recording unit 260 to record the corresponding block number (S304). When the first sound signal is not damaged (N in S302) but is missing (Y in S306), the processing unit 250 causes the recording unit 260 to record the corresponding block number (S308). When the first sound signal is not missing (N in S306), step 308 is skipped.

As shown in FIG. 4C, the sound quality evaluation unit 252 sets "OK" in "Broken Flag" when there is no problem with the quality of the first sound signal, sets "NG" in "Broken Flag" when the quality of the first sound signal is deteriorated, and sets "Lost" in "BrokenFlag" when the first sound signal cannot be acquired. The sound quality evaluation unit 252 determines that the quality of the first sound signal has a problem in the case the first sound signal is deteriorated, and in the case the first sound signal cannot be acquired. When there is a problem with the quality of the first sound signal, i.e., when the call state is not good (N in S310), the sound quality evaluation unit 252 causes the first communication unit 212 to transmit a poor call status notice (S312). The first communication unit 212 transmits the poor call status notice to the first terminal apparatus 100a.

When the first communication unit 212 does not receive a retransmission confirmation request from the first terminal apparatus 100a (N in S314), the first communication unit 212 stands by. When the first communication unit 212 receives the retransmission confirmation request from the first terminal apparatus 100a (Y in S314), the sound quality evaluation unit 252 causes the first communication unit 212 to transmit a retransmission notice (S316). As shown in FIG. 4D, the retransmission notice includes the call ID and the block number of the first sound signal having a quality problem. That is, the sound quality evaluation unit 252 causes the first communication unit 212 to transmit a retransmission notice when the quality of the first sound signal received by the first communication unit 212 is lower than a threshold value. The first communication unit 212 transmits the retransmission notice to the first terminal apparatus 100a.

The first communication unit 212 receives the transmission request from the first terminal apparatus 100a (S318). The first communication unit 212 transmits a transmission permission notice to the first terminal apparatus 100a (S320). The first communication unit 212 re-receives a first sound signal with a call ID attached thereto from the first terminal apparatus 100a (S322). When the data integrity, which indicates whether the re-received first sound signal matches the call ID and the block number included in the retransmission notice and whether the sound quality does not have a problem, is OK (Y in S324), the sound quality evaluation unit 252 causes the recording unit 260 to record the re-received first sound signal (S326). This corresponds to replacing the first sound signal already recorded in the recording unit 260 with the first sound signal re-received by the first communication unit 212. The first communication unit 212 transmits "OK" to the first terminal apparatus 100a to indicate a result of the first sound signal (S328). If the data integrity of the first sound signal is not found to be OK in the sound quality evaluation unit 252 (N in S324), the first communication unit 212 transmits "NG" to the first terminal apparatus 100a to indicate a result of the first sound signal (S330). When there is no problem with the quality of the first sound signal, on the other hand, i.e., when the call state is good (Y in S310), steps 312 to 330 are skipped.

(2) Second Process

Figure 12:
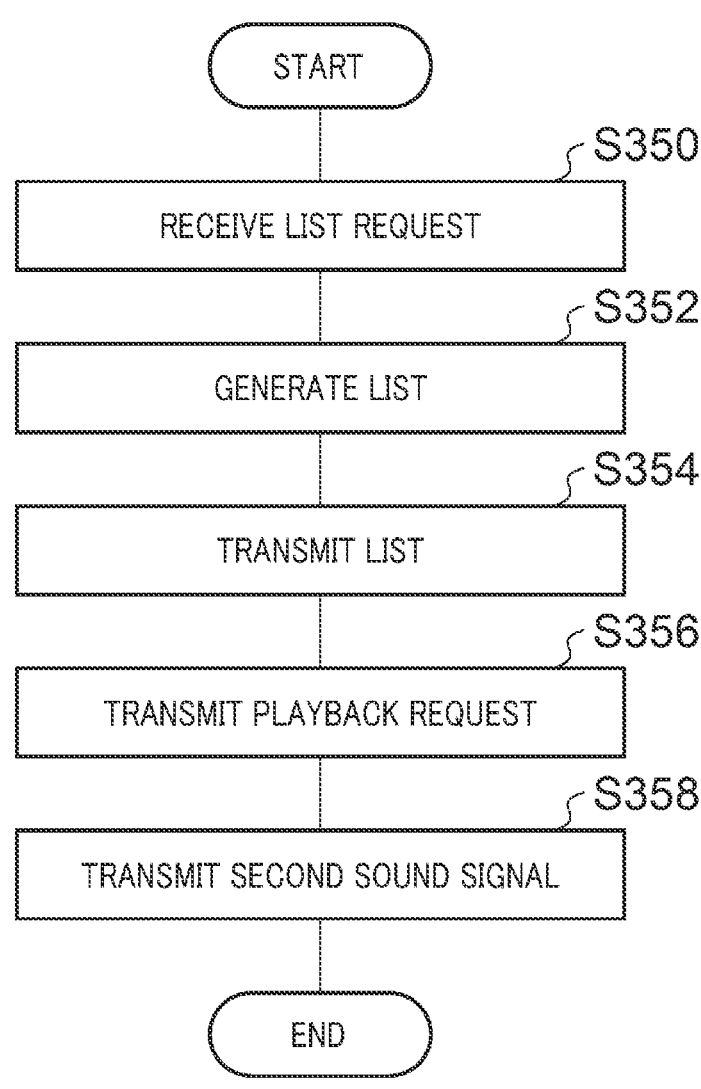
FIG. 12 is a flowchart illustrating another communication procedure performed by the wireless relay apparatus of FIG. 10.

FIG. 12 is a flowchart illustrating another communication procedure performed by the wireless relay apparatus 200. The relay recording control unit 254 outputs control information including the call ID of the second sound signal transmitted last in time to the second communication unit 214. The control information is as shown in FIG. 6. The second communication unit 214 periodically transmits control information to notify the terminal apparatus 100. When the call ID included in the control information and the last call ID do not match in the second terminal apparatus 100b that has received the control information, the second terminal apparatus 100b transmits a list request to the wireless relay apparatus 200. The list request includes the last call ID. The second communication unit 214 receives the list request from the second terminal apparatus 100b (S350). The second communication unit 214 outputs the list request to the processing unit 250.

The relay recording control unit 254 extracts the last call ID from the received list request. The last call ID is also called the last identifier. The relay recording control unit 254 generates a list of call IDs recorded in the recording unit 260 after the last call ID (S352). The relay recording control unit 254 outputs the list to the second communication unit 214. The second communication unit 214 transmits the list to the second terminal apparatus 100b (S354).

The second communication unit 214 receives a playback request from the second terminal apparatus 100b that has received the list (S356). The playback request includes a call ID (transmission request identifier) for which the second terminal apparatus 100b requests playback from among the call IDs included in the list. The relay recording control unit 254 extracts the first sound signal corresponding to the call ID indicated in the received playback request from the recording unit 260. The relay recording control unit 254 outputs the extracted first sound signal to the second communication unit 214 as the second sound signal. The second communication unit 214 transmits the second sound signal to the second terminal apparatus 100b (S358).

Figure 13:
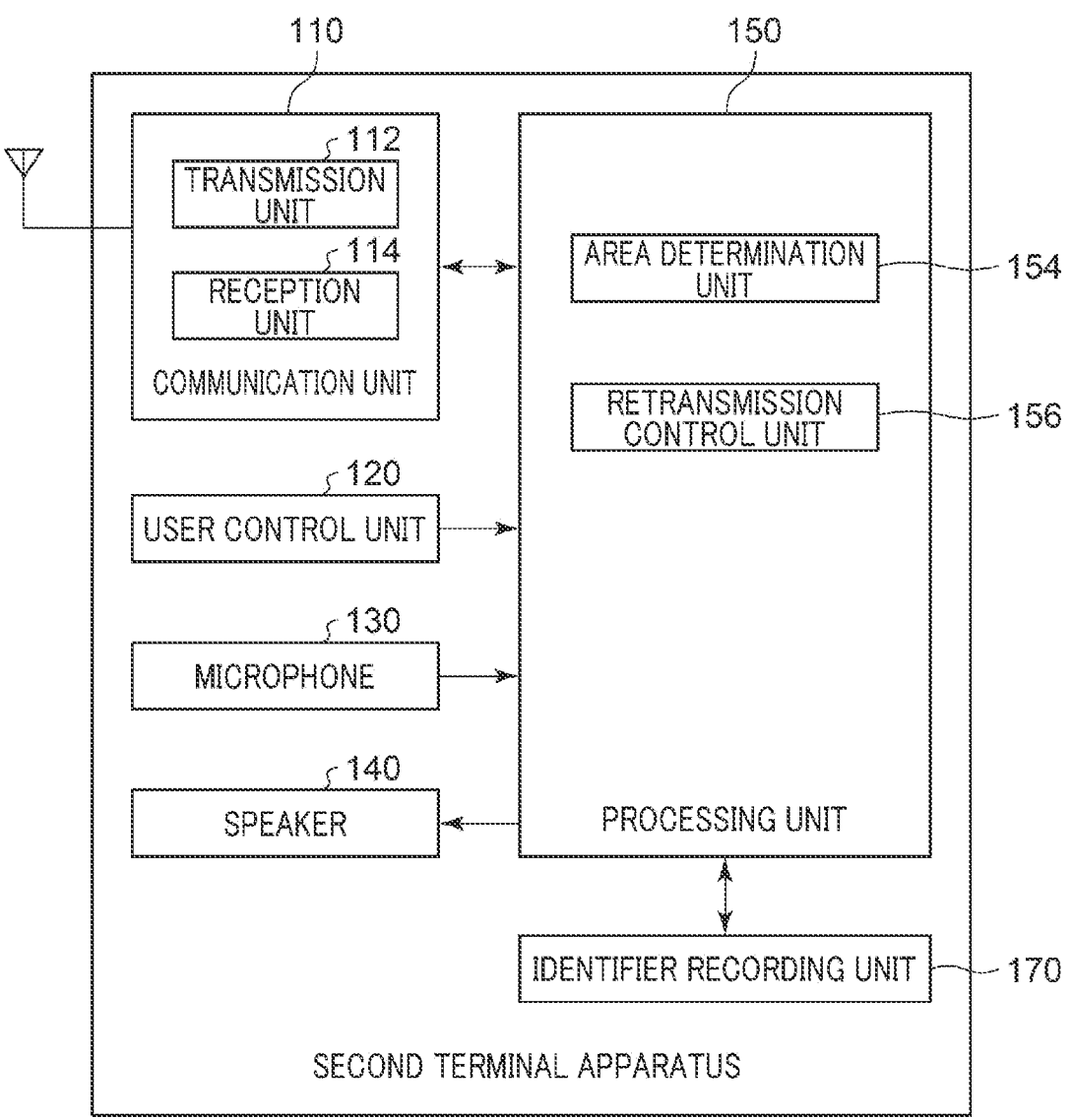
FIG. 13 shows a configuration of the second terminal apparatus of FIG. 1.

FIG. 13 shows a configuration of the second terminal apparatus 100b. The second terminal apparatus 100b includes a communication unit 110, a user control unit 120, a microphone 130, a speaker 140, a processing unit 150, and an identifier recording unit 170. The communication unit 110 includes a transmission unit 112 and a reception unit 114, and the processing unit 150 includes an area determination unit 154 and a retransmission control unit 156. To make the description clear, the first terminal apparatus 100a and the second terminal apparatus 100b are assumed to be configured differently, but they may have a common configuration as the terminal apparatus 100. The reception unit 114 receives the second sound signal with a call ID attached thereto from the wireless relay apparatus 200. The processing unit 150 plays back the sound based on the second sound signal and outputs the sound from the speaker 140. The processing unit 150 causes the identifier recording unit 170 to record the call ID received last in time by the reception unit 114 as the last call ID. The identifier recording unit 170 records the last call ID.

Figure 14:
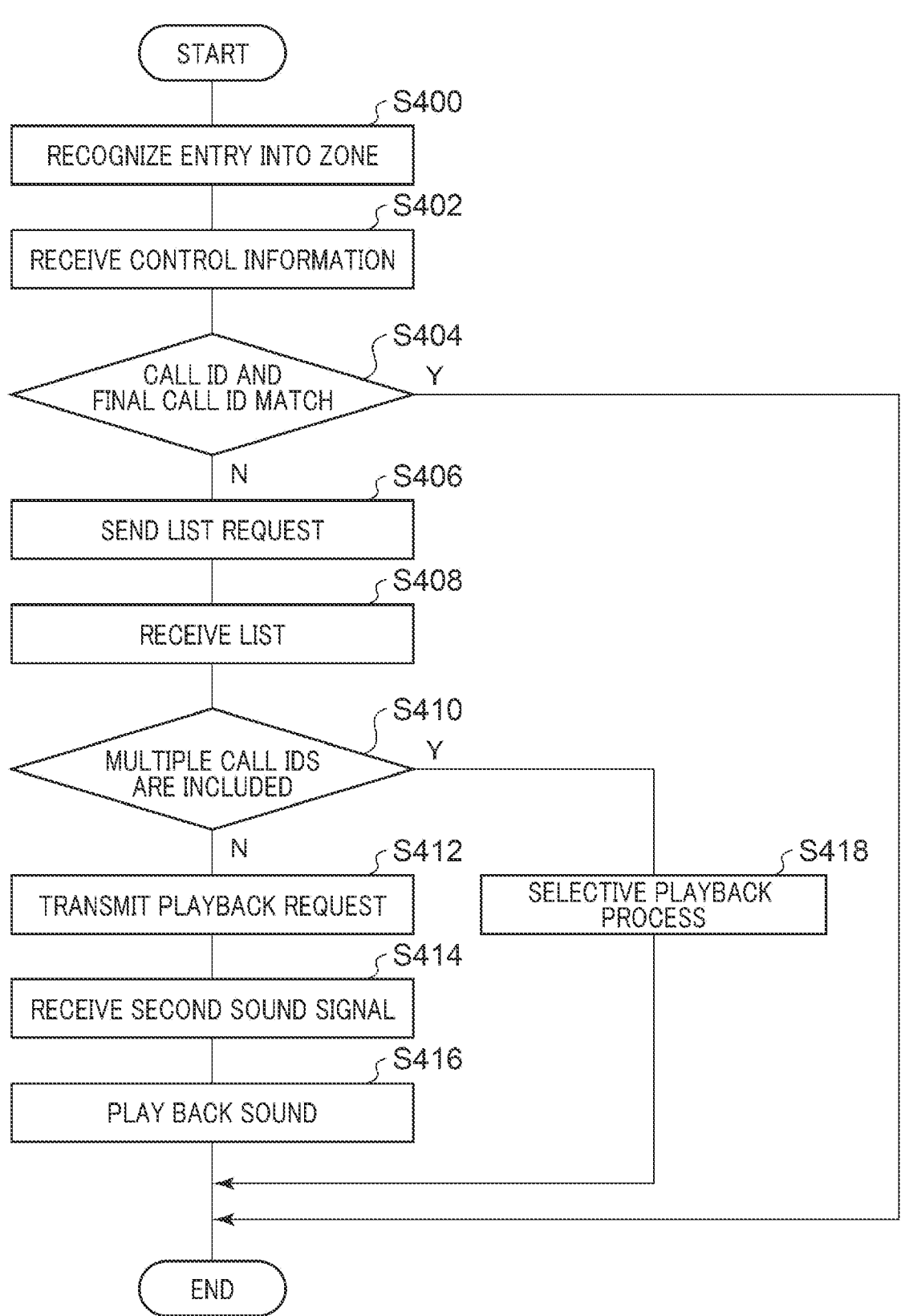
FIG. 14 is a flowchart showing a communication procedure performed by the second terminal apparatus of FIG. 13.

FIG. 14 is a flowchart showing a communication procedure performed by the second terminal apparatus 100b. As described above, it is assumed that the second terminal apparatus 100b is moving from outside the second communication service area 10b toward the first communication service area 10a as shown in FIG. 1. The area determination unit 154 determines whether the second terminal apparatus 100b is located in the communication service area 10 of the wireless relay apparatus 200. The area determination unit 154 determines that the second terminal apparatus 100b is located in the communication service area 10 when, for example, the second communication unit 214 receives a signal from the wireless relay apparatus 200, and determines that the second terminal apparatus 100b is not located in the communication service area 10 when the second communication unit 214 does not receive a signal from the wireless relay apparatus 200. As a result of the movement from outside the second communication service area 10b toward the first communication service area 10a, the area determination unit 154 recognizes an entry into the zone of the communication service area 10 (S400). However, the second terminal apparatus 100b can recognize that it is within the zone of the communication service area 10 by receiving a control signal described later from the wireless relay apparatus 200, and the process of S400 is not necessarily essential. The second terminal apparatus 100b can know that it is positioned to exchange signals reliably with the wireless relay apparatus 200 by recognizing a difference between the first communication service area 10a and the second communication service area 10b by means of the area determination unit 154.

The reception unit 114 receives, from the wireless relay apparatus 200, control information including the call ID of the second sound signal transmitted last in time from the wireless relay apparatus 200 (S402). The retransmission control unit 156 compares the call ID included in the control information received by the reception unit 114 with the last call ID recorded last in time in the identifier recording unit 170. When the call ID and the last call ID do not match (N in S404), the retransmission control unit 156 outputs a list request including the last call ID to the transmission unit 112. The transmission unit 112 transmits the list request to the wireless relay apparatus 200 (S406).

The reception unit 114 receives the list from the wireless relay apparatus 200 (S408). As described above, the list shows the call ID recorded in the wireless relay apparatus 200 after the last call ID. The retransmission control unit 156 extracts the call ID included in the list. When a plurality of call IDs are not included in the list (N in S410), the retransmission control unit 156 outputs a playback request indicating the call ID included in the list to the transmission unit 112. The transmission unit 112 transmits the playback request to the wireless relay apparatus 200 (S412). The reception unit 114 re-receives the second sound signal with a call ID attached thereto from the wireless relay apparatus 200 (S414). The processing unit 150 plays back the sound based on the second sound signal (S416) and causes the speaker 140 to output the sound. When a plurality of call IDs are included in the list (Y in S410), the processing unit 150 performs a selective playback process (S418). When the call ID and the last call ID match (Y in S404), on the other hand, the retransmission control unit 156 ends the process without causing the transmission unit 112 to transmit a list request.

Figure 15:
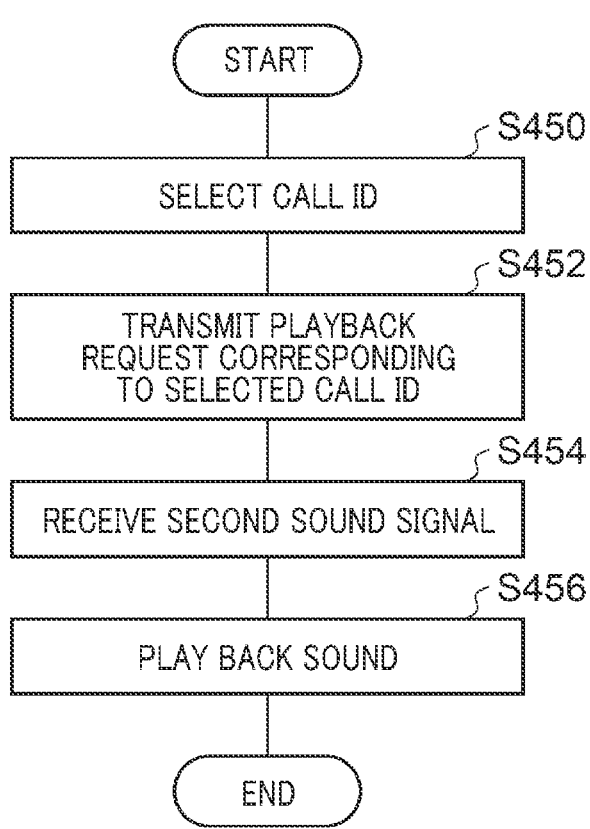
FIG. 15 is a flowchart showing a procedure for selective playback process performed by the second terminal apparatus of FIG. 13.

FIG. 15 is a flowchart showing a procedure for selective playback process performed by the second terminal apparatus 100*b*. This corresponds to the process of step 418 in FIG. 14. The retransmission control unit 156 selects one or more call IDs for which playback is requested from among the plurality of call IDs included in the list (S450). Selection is made, for example, based on a selection instruction received by the user control unit 120 from the user. Further, the retransmission control unit 156 may automatically perform the selection. The retransmission control unit 156 outputs a playback request for the selected call ID to the transmission unit 112. The transmission unit 112 transmits the playback request to the wireless relay apparatus 200 (S452). The reception unit 114 re-receives the second sound signal with a call ID attached thereto from the wireless relay apparatus 200 (S454). The processing unit 150 reproduces the sound based on the second sound signal (S456) and causes the speaker 140 to output the sound.

The features are implemented in hardware such as a CPU, a memory, or other LSIs, of any computer and in software such as a program loaded into a memory. The figures depict functional blocks implemented by the cooperation of these elements. Therefore, it will be understood by those skilled in the art that these functional blocks may be implemented in a variety of manners by hardware only, software only, or by a combination of hardware and software.

According to this embodiment, an identifier is transmitted to the first terminal apparatus when the quality of the received first sound signal is lower than a threshold value. When the first sound signal is re-received from the first terminal apparatus thereby, the first sound signal re-received is recorded. Accordingly, the accurate first sound signal can be recorded. Further, since the accurate first sound signal is recorded, the accuracy of sound signal communication can be improved. When the last call ID is received, a list of call IDs recorded after the last call ID is transmitted to the second terminal apparatus so that the call ID recorded after the last call ID can be recognized by the second terminal apparatus. Further, when the call ID included in the list is received, the second sound signal corresponding to the call ID is transmitted to the second terminal apparatus so that the accuracy of sound signal communication can be improved. Further, since the call ID of the second sound signal transmitted last in time is communicated, it is possible to cause the second terminal apparatus to confirm whether all call IDs have been received.

Further, the first sound signal with a call ID attached thereto is transmitted to the wireless relay apparatus and is also recorded in the recording unit. When the identifier is received from the wireless relay apparatus, the first sound signal corresponding to the identifier is extracted from the recording unit and transmitted to the wireless relay unit. Accordingly, the accuracy of sound signal communication can be improved. Further, when a list of call IDs recorded in the wireless relay apparatus after the last call ID is received, the call ID included in the list is transmitted to the wireless relay apparatus so that it is possible to request retransmission of the second sound signal corresponding to the call ID. Further, since retransmission of the second sound signal corresponding to the call ID is requested, the accuracy of the sound signal communication can be improved. Further, when the call ID of the second sound signal transmitted last in time from the wireless relay apparatus matches the last call ID, the last call ID is not transmitted so that occurrence of unnecessary communication can be prevented.

Given above is a description based on an embodiment. In the embodiment, a sound signal has been discussed, but the embodiment is also applicable to an information signal such as a data signal. The embodiment is intended to be illustrative only and it will be understood by those skilled in the art that various modifications to combinations of constituting elements and processes are possible and that such modifications are also within the scope of the present invention.

The invention claimed is:

1. A wireless relay apparatus comprising:
a first communication hardware or hardware plus software that receives a first sound signal with an identifier attached thereto from a first terminal apparatus;
a second communication hardware or hardware plus software that transmits the first sound signal received by the first communication hardware or hardware plus software to a second terminal apparatus as a second sound signal along with the identifier;
a recording hardware or hardware plus software that records the first sound signal and the identifier received by the first communication hardware or hardware plus software; and
a relay recording control hardware or hardware plus software that, when the second communication hardware or hardware plus software receives the identifier received last in time by the second terminal apparatus from the second terminal apparatus as a last identifier, causes the second communication hardware or hardware plus software to transmit a list of identifiers recorded in the recording hardware or hardware plus software after the last identifier to the second terminal apparatus, and that, when the second communication hardware or hardware plus software receives the identifier included in the list from the second terminal apparatus as a transmission request identifier, extracts the first sound signal corresponding to the transmission request identifier from the recording hardware or hardware plus software and causes the second communication hardware or hardware plus software to transmit the first sound signal extracted to the second terminal apparatus as the second sound signal.

2. The wireless relay apparatus according to claim 1, further comprising:
a sound quality evaluation hardware or hardware plus software that evaluates a quality of the first sound signal received by the first communication hardware or hardware plus software, that transmits the identifier of the first sound signal from the first communication hardware or hardware plus software to the first terminal apparatus as a retransmission request identifier, when an evaluation value is lower than a threshold value, and that replaces the first sound signal corresponding to the retransmission request identifier recorded in the recording hardware or hardware plus software with the first sound signal re-received, when the first communication hardware or hardware plus software re-receives the first sound signal with the retransmission request identifier attached thereto and when the evaluation value is equal to or higher than the threshold value.

3. A first terminal apparatus that communicates with the wireless relay apparatus according to claim 2, the first terminal apparatus comprising:
a transmission hardware or hardware plus software that transmits the first sound signal with the identifier attached thereto to the wireless relay apparatus;
a recording hardware or hardware plus software that records the first sound signal and the identifier transmitted from the transmission hardware or hardware plus software plus software;

a reception hardware or hardware plus software that receives the retransmission request identifier from the wireless relay apparatus; and a retransmission control hardware or hardware plus software that, when the reception hardware or hardware plus software receives the retransmission request identifier, extracts the first sound signal corresponding to the retransmission request identifier from the recording hardware or hardware plus software and causes the transmission hardware or hardware plus software to re-transmit the first sound signal extracted.

4. A second terminal apparatus that communicates with the wireless relay apparatus according to claim 1, the second terminal apparatus comprising:

a reception hardware or hardware plus software that receives the second sound signal with the identifier attached thereto from the wireless relay apparatus;

an identifier recording hardware or hardware plus software that records the identifier received by the reception hardware or hardware plus software;

a transmission hardware or hardware plus software that transmits the identifier recorded last in time in the identifier recording hardware or hardware plus software to the wireless relay apparatus as the last identifier; and a retransmission control hardware or hardware plus software that, when the reception hardware or hardware plus software receives a list of identifiers recorded in the wireless relay apparatus after the last identifier from the wireless relay apparatus, causes the transmission hardware or hardware plus software to transmit the identifier included in the list to the wireless relay apparatus as a transmission request identifier, wherein the reception hardware or hardware plus software re-receives the second sound signal with the transmission request identifier attached thereto from the wireless relay apparatus.

5. A communication system comprising:

a first terminal apparatus that transmits a first sound signal with an identifier attached thereto;

a wireless relay apparatus that transmits the first sound signal as a second sound signal along with the identifier, when the first sound signal with the identifier attached thereto is received from the first terminal apparatus; and a second terminal apparatus that receives the second sound signal with the identifier attached thereto from the wireless relay apparatus, wherein the wireless relay apparatus includes:

a recording hardware or hardware plus software that records the first sound signal and the identifier received;

a sound quality evaluation hardware or hardware plus software that evaluates a quality of the first sound signal received, that transmits the identifier to the first terminal apparatus as a retransmission request identifier, when an evaluation value is lower than a threshold value, and that replaces the first sound signal recorded in the recording hardware or hardware plus software with the first sound signal re-received, when the first sound signal with the retransmission request identifier attached thereto is re-received from the first terminal apparatus and when the evaluation value is equal to or higher than the threshold value: and a relay recording control hardware or hardware plus software that, when the identifier received last in time by the second terminal apparatus is received from the second terminal apparatus as a last identifier, transmits a list of identifiers recorded in the recording hardware or hardware plus software after the last identifier to the second terminal apparatus, and that, when the identifier included in the list is received from the second terminal apparatus as a transmission request identifier, extracts the first sound signal corresponding to the transmission request identifier from the recording hardware or hardware plus software and transmit the first sound signal extracted to the second terminal apparatus as the second sound signal.

* * * * *